United States Patent Office 2,728,676
Patented Dec. 27, 1955

2,728,676

PROCESSED FOOD AND METHOD OF PREPARATION

Leland H. Burt, Wilmington, Del., assignor to Hercules Powder Company, Wilmington, Del., a corporation of Delaware No Drawing. Application April 24, 1952, Serial No. 284,208

6 Claims. (Cl. 99—154)

This invention relates to processed food products such as fruits and vegetables and to methods of maintaining firmness and natural color in processed fruit and vegetable products.

A considerable portion of the annual fruit and vegetable crop cannot be utilized for commercial processing such as canning, pickling, freezing, or other preservation processes because the fruits or vegetables are too soft to withstand treatment by conventional methods. The lack of firmness of the plant tissue which causes it to disintegrate on subsequent processing and handling may be due to overripe condition or may constitute an inherent characteristic of a given variety.

As an example, apple processors have the problem that in an unpredictable length of time after an apple matures it loses its comparatively firm texture, and cannot be cooked without becoming mushy. Thus, apple slices from such apples cannot be baked in a pie and have the slices retain their shape. The incidence of this loss of firmness depends on many factors such as the variety of apple, meteorological conditions at picking time, storage conditions, etc. The cause is believed to be due to enzymatic degradation of the pectins in the cell walls of the plant tissue.

Accordingly, it is an object of this invention to provide methods for maintaining firmness and natural color in fruits and vegetables during processing and cooking operations. Another object is to provide means for inhibiting the disintegration of fruits and vegetables during preservation processes. A further object is the production of improved fruit and vegetable products.

According to this invention firmness and natural color in food of the group consisting of fruits and vegetables are maintained during processing and cooking by treating the food during the processing thereof at blanching temperatures with an aqueous solution containing between about 0.2 and about 1%, preferably between about 0.2 and about 0.2 and about 0.5%, by weight of carboxyalkyl cellulose derivative. Preferably, the food then is preserved, such as by freezing or canning, in the presence of the carboxyalkyl cellulose derivative. Thus, the aqueous solution in which the food is processed contains a small amount of carboxyalkyl cellulose derivative A portion of this carboxyalkyl cellulose derivative solution is absorbed by the food during the processing thereof, and preferably the food is subsequently preserved in the presence of the carboxyalkyl cellulose derivative. Thus, the processed foods in accordance with this invention contain a small amount of carboxyalkyl cellulose derivative sufficient to maintain firmness and natural color in the food.

As illustrative embodiments of a manner in which the invention may be carried out in practice, the following examples are given. However, these are not to be construed as limiting the invention.

EXAMPLE 1

Stayman apples which had been in cold storage for approximately 5 months and which were very soft were peeled, cored and sliced into eighths. Four pounds of the apple slices were placed in a glass vessel equipped with a valved inlet and means for evacuating the vessel. A vacuum equivalent to approximately 29 inches of mercury was drawn on the vessel and contents at room temperature, and was held for five minutes. The vacuum was then broken by introducing 2½ liters of hot water at approximately 190° F. Vacuum for one minute was reapplied to remove air introduced with the water, and then was broken. The hot water covered the apple slices which were allowed to stand in the hot water for five minutes. At the end of this time the temperature near the center of the mass of apple slices was approximately 133° F. The apple slices were then drained and weighed, and it was found that 4 lb. of fruit had taken up 10 oz. of aqueous blanching liquor, equivalent to 15.6% based on the original weight of fruit. The drained blanching liquor was saved.

At this point the apple slices appeared soft and ragged and had darkened to the point where they were quite brown. For preserving the fruit, 23 oz. of the blanched apple slices were packed in each quart jar, together with 11 oz. of the drained blanching liquor. The jars were then processed for 20 minutes in boiling water, sealed and inverted until cool. After canning the apple slices had largely disintegrated into a pasty apple sauce, quite brown in color. What apple slices remained were very soft and ragged and disintegrating. In short, the appearance of the canned fruit was distinctly unsatisfactory with regard to color, consistency and texture.

EXAMPLE 2

Substantially the same procedure followed in Example 1 was repeated in this example, except that in place of hot water a hot aqueous sucrose solution at approximately 190° F. containing 40% by weight of sucrose and 0.5% by weight of a commercial food grade sodium carboxymethylcellulose, designated as Hercules CMC-70-H, was employed to blanch the apple slices. After standing in the aqueous syrup for five minutes the temperature near the center of the mass of apple slices was approximately 134° F. After draining the fruit was found to have taken up 13.25 oz. of the blanching liquor, equivalent to 20.7% based on the original weight of fruit.

At this point all of the apple slices were of firm texture, free of ragged appearance, with substantially no discoloration. For preserving the fruit, 23 oz. of the blanched apple slices were packed in each quart jar, together with 12.25 oz. of the drained blanching liquor, and the jars were processed as in Example 1.

The canned apple slices had a very satisfactory appearance, being firm, free of raggedness, with substantially no discoloration.

EXAMPLES 3-7

Substantially the same blanching and preserving procedure followed in Example 2 was repeated in these examples, employing different blanching liquors in each. Pertinent data for these examples are given in Table 1 following. In every instance the sliced fruit both after blanching and after canning had a very satisfactory appearance, as set forth in the table, in contrast to the appearance of the fruit processed in Example 1.

Table 1

| Example | Blanching Liquor Composition | Percent by Weight | Temp., °F. | Temperature After 5 Min. Blanching, °F. | Blanching Liquor Taken up by Fruit (Oz.) | Blanching Liquor Taken up by Fruit (Percent) | Appearance of Fruit After Blanching | Appearance of Fruit After Canning |
|---|---|---|---|---|---|---|---|---|
| 3 | Water<br>Sucrose<br>Sodium Carboxymethylcellulose (Hercules CMC-70-H). | 79.25<br>20.00<br>0.75 | 190 | 124 | 16.25 | 25.4 | Firm; Free of raggedness; Substantially no discoloration. | Firm; Free of raggedness; Substantially no discoloration. |
| 4 | Water<br>Sucrose<br>Sodium Carboxymethylcellulose (Hercules CMC-70-L). | 59.5<br>40.0<br>0.5 | 180 | 124 | 11 | 17.2 | ......do...................... | Do. |
| 5 | Water<br>Sucrose<br>Sodium Carboxymethylcellulose (Hercules CMC-70-M). | 59.5<br>40.0<br>0.5 | 184 | 130 | 10 | 15.6 | ......do...................... | Do. |
| 6 | Water<br>Sucrose<br>Sodium Carboxymethylcellulose (Hercules CMC-70-H). | 79.5<br>20.0<br>0.5 | 190 | 120 | 14.25 | 22.3 | ......do...................... | Do. |
| 7 | Water<br>Sucrose<br>Sodium Carboxymethylcellulose (Hercules CMC-70-H). | 87.25<br>12.00<br>0.75 | 192 | 122 | 13.5 | 21.2 | ......do...................... | Do. |

EXAMPLE 8

The canned fruit from Examples 1–7 inclusive was baked in pies employing standard pie conditions.

Each of the jars contained approximately 600 grams of fruit and 400 grams of juice. The fruit was drained and the juice retained. To 200 grams of the juice was added 20 grams of cornstarch, ¼ teaspoon cinnamon and sufficient sugar to bring the total sugar in the juice to 40% by weight. This juice was brought to a boil, combined with the drained fruit and prepared into a two-crust pie which was baked at 425° F. for 45 minutes.

The pie containing the fruit processed without any carboxymethyl cellulose derivative was rated as being highly unsatisfactory, for the fruit had lost all semblance of form, being a pasty apple sauce quite dark in color.

In every instance the pies containing fruit processed in the presence of carboxymethyl cellulose derivative were rated as satisfactory, the fruit being in firm slices of a light natural color.

EXAMPLES 9–13

In these examples Rome Beauty apples which had been held in cold storage approximately 5 months, and which were very soft, were peeled, cored and sliced into eighths, and placed in sodium chloride solution to hold them properly until processed.

In each example 4 pounds of apple slices removed from the sodium chloride solution and drained were placed in a 3000-cc. glass container equipped with means for evacuation. A vacuum equivalent to 17 inches of mercury was drawn on the container and fruit at room temperature and held four minutes. The vacuum was then broken with steam. The apple slices were then packed into No. 10 cans to fill the cans, and 10 oz. of aqueous solution heated to 190° F. was added to each can. The composition of aqueous solution employed differed in each example, as set forth in Table 2 following. The cans were then sealed and processed in boiling water. After storing for 10 days the cans were opened for examination. Results are given in Table 2.

Table 2

| Example | Composition of Aqueous Solution, Percent by Weight | | Appearance of Canned Fruit |
|---|---|---|---|
| 9 | Water | 100 | Unsatisfactory. Fruit completely disintegrated into pasty apple sauce. Dark in color. |
| 10 | Water<br>Sucrose | 80<br>20 | Unsatisfactory. Fruit slices of poor texture with marked tendency to disintegrate. Dark in color. A very high amount of juice drainage when contents of can were placed on a screen. |
| 11 | Water<br>Sodium Carboxymethylcellulose (Hercules CMC-70-H). | 99.5<br>0.5 | Satisfactory. Fruit slices firm. Very little darkening. No drainage of juice when contents of can were placed on a screen. |
| 12 | Water<br>Sucrose<br>Sodium Carboxymethylcellulose (Hercules CMC-70-H). | 96.0<br>3.5<br>0.5 | Satisfactory. Fruit slices firm. Substantially no discoloration. No drainage of juice when contents of can were placed on a screen. |
| 13 | Water<br>Sucrose<br>Sodium Carboxymethylcellulose (Hercules CMC-70-H). | 79.5<br>20.0<br>0.5 | Do. |

From Table 2 it is apparent that water alone, or water containing sugar by itself, was an unsatisfactory processing liquor, in both cases resulting in fruit of poor consistency, texture and color. On the other hand, water containing a small amount of sodium carboxymethylcellulose or sugar solutions containing sodium carboxymethylcellulose were eminently satisfactory as processing liquors, the fruit in these cases being firm slices, with very little or no discoloration, and exhibiting no juice drainage.

EXAMPLE 14

In this example, instead of first drawing a vacuum on the fruit and breaking the vacuum by introducing the hot blanching liquor, as in Examples 1–7, inclusive, the apple slices were immersed in an aqueous sucrose solution at 190° F. containing 40% sucrose and 0.5% by weight of sodium carboxymethylcellulose (Hercules CMC–70–H) in a vessel equipped with means for evacuation. A vacuum equivalent to 29 inches of mercury was drawn on the fruit and contents. The vacuum was then broken with air and the contents of the vessel permitted to stand 5 minutes. The fruit was subsequently preserved following substantially the same procedure as in Example 2. The canned apple slices were firm, free of raggedness, with substantially no discoloration.

The important feature in accordance with this invention is the treatment of the fruit or vegetable during processing thereof at blanching temperatures with an aqueous solution containing a small amount of carboxyalkyl cellulose derivative. This feature is adaptable to any of the usual commercial or home processing methods for treating fruits and vegetables. For example, in one embodiment of the invention a vacuum is drawn on the food and the vacuum is broken by flooding the food with an aqueous solution containing carboxyalkyl cellulose derivative at blanching temperatures. In another embodiment a vacuum is drawn on the food, the vacuum is broken with steam and the food is then treated at blanching temperatures with an aqueous solution containing carboxyalkyl cellulose derivative. Alternatively, in still another embodiment of the invention the food is first immersed in an aqueous solution containing carboxyalkyl cellulose derivative at blanching temperatures, a vacuum is drawn on the solution containing the fruit or vegetable, and the vacuum is then broken.

Vacuum processing as set forth hereinabove, while generally applicable to the processing of all fruits and vegetables, is particularly suitable for the commercial processing of porous fruits and vegetables, such as cold-storage apples, to remove air in the pores. However, nonporous fruits and vegetables containing little or no occluded air do not require vacuum processing. With such nonporous fruits or vegetables it is sufficient merely to process them in an aqueous solution containing carboxyalkyl cellulose derivative at blanching temperatures. It will be understood, of course, that this invention also embraces processing at superatmospheric pressures such as are encountered in conventional commercial and home pressure cookers.

Although in the foregoing examples the process of this invention is described as applied to the treatment of apple slices, similar results are obtained by applying analogous procedures for the treatment of other fruits and vegetables, such as, for example, pears, plums, peaches, cherries, blueberries, whole pack tomatoes, onions, asparagus, potatoes, carrots, string beans, and the like.

Treatment of fruits and vegetables in accordance with this invention is done at blanching temperatures. It is well known in the art that all fruits and vegetables contain enzymes which must be destroyed in order to preserve the food. This is accomplished by heating the food in hot or boiling water or aqueous solutions until the food becomes uniformly heated throughout to a temperature sufficiently high to destroy the enzymes. This is commonly referred to as blanching. Hence, blanching temperatures are elevated temperatures high enough to destroy enzymes, ranging from about 160° F. upward to about 260° F. Temperatures above about 212° F. are, of course, realized only at superatmospheric pressures in pressure cookers.

The aqueous solutions in accordance with this invention will contain as an essential ingredient between about 0.2% and about 1%, and preferably between about 0.2% and about 0.5% of carboxyalkyl cellulose derivative. Any water-soluble carboxyalkyl cellulose derivative is suitable for the purposes of this invention and includes, by way of example, the alkali metal, magnesium, and ammonium salts of carboxymethylcellulose, carboxyethyl cellulose, carboxypropyl cellulose, hydroxyethyl carboxymethylcellulose, methyl carboxymethylcellulose, hydroxyethyl carboxyethyl cellulose, and the like. A particularly suitable carboxyalkyl cellulose derivative is the commercially available purified sodium salt of carboxymethylcellulose commonly known in the food and pharmaceutical arts as "Cellulose Gum." Any viscosity type of carboxyalkyl cellulose derivative is suitable for the purposes of this invention, and the viscosity can range from about 20 cps. or even lower for a 2% solution in water to as high as 2500 cps. or higher for a 1% solution in water. Normally higher viscosity materials are preferred, as exemplified by the material commercially available as Hercules CMC–70–H, manufactured by the Hercules Powder Company.

The aqueous solutions of carboxyalkyl cellulose derivative employed in this invention may contain other ingredients commonly employed in the processing and preservation of fruits and vegetables. To illustrate, sugar may be employed in varying amounts from as little as 2 or 3% by weight of the aqueous solution to as much as 40 to 50%, as necessary or desired, or may be eliminated entirely from the aqueous solution of carboxyalkyl cellulose derivative employed for processing fruits. Citric acid in small amounts may also be added to the aqueous carboxyalkyl cellulose derivative solutions employed for processing bland fruits. Small amounts of common table salt are commonly added to the aqueous solutions in which vegetables are processed.

Although fruits and vegetables processed in accordance with this invention can be consumed immediately or shortly after processing, they are usually preserved for future consumption. Any of the usual methods for preserving food may be employed, as desired, including freezing, pickling, canning, and the like. Canning is the most commonly employed method of preservation for future consumption, and it is preferred to cover the food in the can with the aqueous solution of carboxyalkyl cellulose derivative. In canning processes where the food has been given a preliminary blanching treatment with carboxyalkyl cellulose derivative solution, then part of this blanching liquor is employed to cover the food in the can. In other canning processes involving a steam blanch, fresh carboxyalkyl cellulose derivative solution is employed to cover the food in the can. In still other canning processes the blanching and canning steps are carried out in one operation wherein the unprocessed food is placed in the can, is covered with an aqueous solution of carboxyalkyl cellulose derivative, and is processed at blanching temperatures directly in the can either before or after sealing the can.

Food processed in accordance with this invention absorbs a small amount of carboxyalkyl cellulose derivative from the aqueous treating solution. The amount absorbed is usually quite small, often amounting to less than about 0.005% by weight based on the original weight of the food. It will be understood, of course, that the amount absorbed in any particular case will depend upon many factors, such as kind and type of food being processed, age, porosity, the particular processing method selected, and the like. However, it is seldom that the amount absorbed will exceed 0.1% by weight, based on the weight of food processed. Yet this small amount of carboxyalkyl cellulose derivative is sufficient to maintain firmness and natural color in the processed food.

What I claim and desire to protect by Letters Patent is:

1. A food preservation process which comprises blanching apple slices in an aqueous solution containing between about 0.2 and about 1% by weight of carboxyalkyl cellulose derivative to maintain firmness and natural color of said apple slices, and preserving the blanched apple slices in said aqueous solution.

2. A food preservation process which comprises drawing a vacuum on apple slices, blanching the apple slices in an aqueous sugar solution containing between about 0.2 and about 1% by weight of carboxyalkyl cellulose derivative to maintain firmness and natural color of said apple slices, and preserving the blanched apple slices in said aqueous sugar solution.

3. A food preservation process which comprises drawing a vacuum on apple slices, breaking the vacuum on the apple slices with an aqueous sugar solution containing between about 0.2 and about 1% by weight of carboxyalkyl cellulose derivative, blanching the apple slices in said aqueous sugar solution to maintain firmness and natural color of said apple slices, and canning the blanched apple slices in said aqueous sugar solution.

4. A food preservation process which comprises drawing a vacuum on apple slices, breaking the vacuum on the apple slices with steam, blanching the apple slices in an aqueous sugar solution containing between about 0.2 and about 1% by weight of carboxyalkyl cellulose derivative to maintain firmness and natural color of said apple slices, and canning the blanched apple slices in said aqueous sugar solution.

5. A preserved food product consisting essentially of blanched apple slices in an aqueous solution containing between about 0.2 and about 1% by weight of carboxyalkyl cellulose derivative, said blanched apple slices being characterized by firmness and natural color.

6. A preserved food product consisting essentially of blanched apple slices in an aqueous solution containing between about 0.2 and about 1% by weight of carboxymethylcellulose derivative, said blanched apple slices being characterized by firmness and natural color.

References Cited in the file of this patent

UNITED STATES PATENTS

| | | |
|---|---|---|
| 2,393,561 | Perech | Jan. 22, 1946 |
| 2,558,042 | Cornwell | June 26, 1951 |
| 2,608,489 | Walker | Aug. 26, 1952 |